Aug. 5, 1952  R. S. STANTON  2,606,289
ELECTRICAL PULSE GENERATOR
Filed March 8, 1945
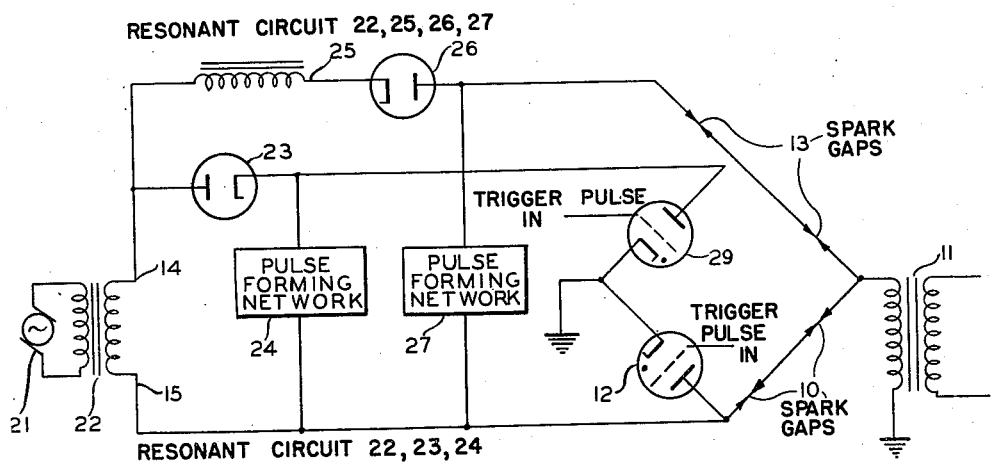
INVENTOR.
RUSSELL S. STANTON
BY
William D. Hall.
ATTORNEY Patented Aug. 5, 1952

2,606,289

UNITED STATES PATENT OFFICE 2,606,289

ELECTRICAL PULSE GENERATOR

Russell S. Stanton, Waban, Mass., assignor, by mesne assignments, to the United States of America as represented by the Secretary of War Application March 8, 1945, Serial No. 581,692

6 Claims. (Cl. 250—27)

This invention relates in general to electrical modulator circuits, and in particular to modulators for applying a plurality of pulse waveforms to one load.

In some types of electronic circuit practice, it is desirable that pulses having differing lengths be developed and transmitted. It is therefore necessary that there be developed a method of and apparatus for creating and impressing such pulses of differing duration onto a load.

Among the objects of the present invention, therefore, are:

1. To provide a modulator for applying a pulse waveform to a load;
2. To provide such a modulator which will apply a plurality of pulse waveforms, in succession, to the load.

In accordance with the present invention, there are provided two or more pulse-forming networks with charging means, two or more gas-filled grid-controlled thermionic tubes, and a load, a pulse transformer being used here for an example. The circuit is connected in such a manner that the successive triggering of individual gas tubes will apply the pulse waveform of the pulse-forming network associated with said gas tube, to the pulse transformer.

My invention will best be understood by reference to the drawing in which the sole figure is a circuit diagram of the complete modulator circuit.

Referring now to said figure, a means of alternating-current resonant charging is illustrated for an example as feeding the pulse-forming networks, such means consisting of alternating-current source 21, transformer 22, and diode 23 for charging pulse-forming network 24; alternating-current source 21, transformer 22, coil 25, diode 26 for charging pulse-forming network 27. Two pulse-forming networks are shown for an example, but any number of pulse-forming networks may be used. One end of pulse-forming network 24 is connected to ground through gas triode 29. The other end of this network is connected through spark gaps 10 to pulse transformer 11. Pulse-forming network 27 has one end connected to ground through gas triode 12 and the other end connected through spark gaps 13 to pulse transformer 11. Elements 22, 25, 26, and 27, and 22, 23, and 24, respectively form resonant circuits.

Referring now to the operation of the system, the source of alternating-current voltage 21 excites the secondary of transformer 22. When the upper side 14 of the secondary of transformer 22 swings positive, diode 23 conducts and pulse-forming network 24 charges. The secondary of the transformer is made to resonate with the capacitance of the pulse-forming network in order to provide a higher voltage across the network. Near the end of the charging cycle, gas tube 29 is triggered, from a source of pulses (not shown), by a positive pulse being applied to its grid. This causes the tube to conduct and so to place one end of network 24 near to ground potential. The other end of the network is raised above ground by a high potential due to the large voltage across network 24. This causes a large voltage to be placed across series spark gaps 10, causing them to break down. Thus, neglecting the voltage drop across the gas tube and that across the spark gaps, the voltage on the pulse-forming network 24 is applied across the pulse transformer 11.

On the next half cycle of the alternating-current voltage from source 21, the lower side 15 of transformer 22 becomes positive, and pulse-forming network 27 is charged through coil 25 and diode 26. Coil 25 is used when the secondary of transformer 22 does not provide enough inductance to resonate with the equivalent capacitance of the pulse-forming network. Gas tube 12 is now caused to conduct by a trigger pulse from a source of pulses (not shown), which may be the same one supplying pulses to tube 29 or be separate therefrom, raising its grid potential above cutoff. This places one end of network 27 near to ground potential. The other end of network 27 is then at a high potential with respect to ground, high enough to break down series spark gaps 13. Thus, neglecting the voltage drop across tube 12 and spark gaps 13, the voltage across network 27 is applied to the pulse transformer 11. The gas tubes extinguish themselves automatically due to the action of the pulse-forming network in order to end the pulse.

When tube 29 and tube 12 are triggered one after the other, the two pulses will be applied in succession to the pulse transformer 11. This reasoning could be applied to any number of pulse-forming networks.

While there has been described what is at present considered the preferred embodiment of the invention, it will be obvious to those skilled in the art that various changes and modifications may be made therein without departing from the invention, and it is, therefore, aimed in the appended claims to cover all such changes and modifications as fall within the true spirit and scope of the invention.

I claim:

1. A load, an electrical modulator for applying a plurality of voltage pulses to said load comprising a plurality of pulse-forming networks, a plurality of diodes, a source of alternating current, means for charging each of said pulse-forming networks through one of said diodes by said alternating-current source, the charging circuit being substantially resonant to the frequency of the alternating current source, a plurality of gas-filled thermionic tubes, a plurality of spark gap elements, each of said gas-filled thermionic tubes being included in a series circuit with one of said spark gap elements, and means for connecting each of said pulse-forming networks alternately to said load through one of said serially-connected circuits, including means for applying trigger pulses to said gas-filled tubes.

2. A load, an electrical modulator for applying a plurality of voltage pulses to said load comprising a plurality of pulse-forming networks, a plurality of gas-filled thermionic tubes, a plurality of spark gap elements, each of said gas-filled thermionic tubes being included in a series circuit with one of said spark gap elements, and means for connecting each of said pulse-forming networks alternately to said load through one of said serially-connected circuits, including means for applying trigger pulses to said gas-filled tubes.

3. An electrical pulse generator comprising: a load; a closed series circuit including a pulse-forming network having two ends, a switch means connected to one end of said network, said load connected to said switch means, and at least one spark gap means connected between said load and the other end of said network; at least one additional closed series circuit including a pulse-forming network having two ends, a switch means connected to one end of said last-named network, said load connected to said last-named switch means, and at least one spark gap means connected between said load and the other end of said last-named network; and a plurality of alternating current charging means connected respectively to said pulse-forming networks.

4. The generator of claim 3, wherein said charging means and their respective pulse-forming networks form resonant circuits.

5. The generator of claim 3, wherein each of said switch means comprises a gas-filled thermionic tube, and means for applying triggering pulses to said switch means.

6. An electrical pulse generator including: a load; first closed series circuit including a pulse-forming network having two ends, a gas-filled thermionic tube responsive to trigger pulses and connected to one end of said network, said load connected to said tube, and at least one spark gap connected between said load and the other end of said network; a second closed series circuit including a pulse-forming network having two ends, a gas-filled thermionic tube responsive to trigger pulses and connected to one end of said last-named network, said load connected to said last-named tube, and at least one spark gap connected between said load and the other end of said last-named network; a coupling means connectable to a source of alternating current and having two output terminals, one of which is connected to one end of each of said pulse-forming networks; a first diode having its anode connected to the other terminal of said coupling means and its cathode connected to the other end of said pulse-forming network in said first series circuit; a choke connected to said other terminal of said coupling means; a second diode having its cathode connected to said choke and its anode connected to the other terminal of said pulse-forming network in said second series circuit; said coupling means, choke, second diode, and pulse-forming network in said second series circuit, and said coupling means, first diode and pulse-forming network in said first series circuit, respectively forming resonant charging circuits for said respective pulse-forming networks.

RUSSELL S. STANTON.

REFERENCES CITED

The following references are of record in the file of this patent:

UNITED STATES PATENTS

| Number | Name | Date |
|---|---|---|
| 2,235,385 | Rava | Mar. 18, 1941 |
| 2,294,388 | Dawson | Sept. 1, 1942 |
| 2,405,070 | Tonks et al. | July 30, 1946 |
| 2,408,824 | Varela | Oct. 8, 1946 |
| 2,439,897 | Rado | Oct. 22, 1946 |
| 2,555,172 | White | May 29, 1951 |

FOREIGN PATENTS

| Number | Country | Date |
|---|---|---|
| 497,147 | Great Britain | Dec. 9, 1938 |